United States Patent
Lavache

(10) Patent No.: US 8,654,708 B2
(45) Date of Patent: Feb. 18, 2014

(54) WIRELESS POSITION SENSING IN THREE DIMENSIONS

(75) Inventor: Steven Lavache, Ware (GB)

(73) Assignee: Performance Designed Products LLC, Sherman Oaks, CA (US)

( * ) Notice: Subject to any disclaimer, the term of this patent is extended or adjusted under 35 U.S.C. 154(b) by 298 days.

(21) Appl. No.: 12/881,100

(22) Filed: Sep. 13, 2010

(65) Prior Publication Data

US 2011/0064025 A1    Mar. 17, 2011

Related U.S. Application Data

(63) Continuation of application No. PCT/GB2009/050679, filed on Jun. 15, 2009.

(51) Int. Cl.
*G08C 15/00*    (2006.01)

(52) U.S. Cl.
USPC ...................................... 370/328; 455/456.1

(58) Field of Classification Search
None
See application file for complete search history.

(56) References Cited

U.S. PATENT DOCUMENTS

| 3,985,024 A | 10/1976 | Horak |
| 2003/0050066 A1* | 3/2003 | Tobe et al. ................... 455/440 |
| 2009/0047976 A1* | 2/2009 | Fujii et al. ................. 455/456.1 |

FOREIGN PATENT DOCUMENTS

JP    2007086039    4/2007

OTHER PUBLICATIONS

Bechler et al., Three Different Reliability Criteria for Time Delay Estimates, Proceedings of the European Signal Processing Conference, vol. 12, Sep. 6-10, 2004, Vienna, Austria.
International Search Report and the Written Opinion for International App No. PCT/GB2009/050679, mailed Jul. 8, 2009, Authorized Officer: Zaneboni, Thomas.

* cited by examiner

*Primary Examiner* — Jeffrey M Rutkowski
(74) *Attorney, Agent, or Firm* — Sheppard Mullin Richter & Hampton LLP

(57) ABSTRACT

A position sensing system enabling dynamic adjustment of the sensing by dynamically adjusting amplifier gain or comparator thresholds in response to received signals. The system compares the time a signal takes to travel from a transmitter in a mobile component to a plurality of receivers in a fixed component and, adjusts the amplifier gain or comparator thresholds if the difference in times measured by the receivers is large or at least one receiver does not detect a signal.

24 Claims, 5 Drawing Sheets

WIRELESS POSITION SENSING IN THREE DIMENSIONS

CROSS-REFERENCE TO RELATED APPLICATIONS

This application is a continuation of and claims the benefit of International Application Number PCT/GB2009/050679 filed Jun. 15, 2009, which is hereby incorporated herein by reference in its entirety.

FIELD OF THE INVENTION

The present invention relates to a method for improving the sensing of a position of a mobile component relative to a fixed component by dynamically adjusting the sensing circuit.

DESCRIPTION OF THE RELATED ART

Many attempts have been made to sense position using ultrasound. An example of a known positioning system 102 is illustrated in FIG. 1 Typically an ultrasonic signal 104 is sent from a mobile component 106, including a transmitter 108, and is received at a fixed component 110, including three or more receivers 1 12. The receivers 1 12 have a fixed spatial relationship to one another, and measuring the time of flight of the signal 104 from the transmitter 108 to the three or more receivers 1 12 enables a measure of distance to be made. By using three or more receivers 112, the differences in time of arrival and the consequent different distance measurements allow trigonometric calculations to be carried out to determine the three dimensional relationship between the mobile 106 and fixed 110 components. Thus far, the theory of ultrasound position sensing is well understood and stands up to close scrutiny.

However, the fixed component 110 is set up with inbuilt assumptions to provide the most accurate position sensing over the range of distances and room sizes in which the system 102 is to he used. The fixed component 1 10 set up must take into account the ability of the system to distinguish between original and reflected signals 4, the polling rate of the components 106, 110 and any discrepancies between the flight times sensed by the receivers 1 12. This necessarily requires a compromise in the setting of the amplifier gain and comparator threshold settings within the fixed component 110.

However, the compromise between the amplifier gain and comparator threshold settings may result in erroneous readings by the fixed component 10. For example, during high polling rates, or within small rooms, reflected signals can be detected and processed by the fixed component 110 if the gain of the amplifiers 114 is too high or the trigger thresholds of the comparator (not shown) too low. This is caused by oversensitivity and as these reflected signals have not had time to drop to a low enough amplitude to be rejected. However, if the gain of the amplifiers 114 is set too low or the trigger threshold of the comparator too high, then direct signals 4 are not detected by the fixed component 10, again resulting in erroneous readings.

As the position sensing system 102 has to detect a large number of signals in a short time, the use of a conventional amplitude gain control circuit means that adjustments to the threshold of the comparator or gain of the amplifier 114 are effected too slowly to solve these problems.

BRIEF SUMMARY OF EMBODIMENTS OF THE INVENTION

A fixed component which mitigates this problem is in accordance with a first aspect of the present invention and provides a fixed component configured to perform position sensing of a wireless mobile component including a transmitter, the fixed component comprising a plurality of receivers arranged in a predetermined spaced-apart relationship, each receiver configured to receive a signal sent from the transmitter, a plurality of timers each timer being associated with a respective one of the plurality of receivers, signal processing means configured to process the signal received at each receiver, timer control means arranged to receive a processed signal and stop the respective timer generally at the time of reception of the received signal by each receiver and feedback means arranged to determine the maximum difference between each of the times at which each timer was stopped, determine if the maximum difference is larger than a specified value and cause an adjustment to the signal processing means if the difference is larger than the specified value.

The control unit may be further arranged to send a timeout signal to the feedback means when no signal is received within a time period and the feedback means is configured to adjust the signal processing means in response to a timeout signal. This enables the fixed component to be adjusted when no signal has been detected within the fixed component.

The signal processing means may be an amplifier or a threshold comparator. If the signal processing means is an amplifier then adjusting the signal processing means comprises varying the gain of the amplifier. Preferably, the feedback means is arranged to decrease the gain of the amplifier in response to determining that the maximum difference is larger than a specified value or increase the gain of the amplifier in response to a timeout signal.

If the signal processing means is a threshold comparator then adjusting the signal processing means comprises varying the threshold of the comparator. Preferably, the feedback means is arranged to increase the threshold of the comparator in response to determining that the maximum difference is larger than a specified value or decrease the threshold of the comparator in response to a timeout signal.

The feedback means may also calculate the average of the times recorded by the timers and adjust the signal processing means by large amount when the average of the times is above a predetermined value and by a small amount when the average of the times is below a predetermined value. This enables the variation of the signal processing means to be an appropriate amount for the strength of the signal that is received by the fixed component. Alternatively, the signal processing means may he varied in incremental steps.

According to another aspect of the present invention there is provided a method of position sensing between a wireless mobile component including a transmitter, and a fixed component including a plurality of receivers arranged in a predetermined spaced-apart relationship, the method comprising the steps of each receiver receiving a signal sent by the transmitter, processing the signal received at each receiver to produce a processed signal, receiving a processed signal at a control unit and stopping a timer associated with each one of the plurality of receivers, each respective timer being stopped generally at the time of reception of the received signal by each receiver, determining the maximum difference between each of the times at which each timer as stopped, determine if the maximum difference is larger than a specified value and adjusting the processing of the signal if the difference is larger than the specified value.

The method may also include the step of sending a timeout signal no signal is received by the receivers within a tune period and adjusting the processing of the signal in response to a timeout signal.

Additionally, the method may include the further step of calculating the average of the times recorded by the timers and adjusting the processing of the signal by a large amount when the average of the times is above a predetermined value and by a small amount when the average of the times is below a predetermined value. Alternatively, the processing of the signal may be varied in incremental steps.

In accordance with a further aspect of the present invention there is provided a fixed component configured to perform position sensing of a wireless mobile component including a transmitter, the fixed component comprising: a plurality of receivers arranged in a predetermined spaced-apart relationship, each receiver configured to receive a signal sent from the transmitter, a plurality of timers each timer being associated with a respective one of the plurality of receivers, signal processing means configured to process the signal received at each receiver, control means arranged to receive a processed signal and stop the respective timer generally at the time of reception of the received signal by each receiver and send a timeout signal to the feedback means when no signal is received within a time period, and feedback means arranged to cause an adjustment to the signal processing means in response to a timeout signal.

The feedback means in the fixed component may be further arranged to determine the maximum difference between each of the times at which each timer was stopped, determine if the maximum difference is larger than a specified value and cause an adjustment to the signal processing means if the difference is larger than the specified value.

In accordance with yet another aspect of the present invention there is provided a method of position sensing between a wireless mobile component including a transmitter, and a fixed component including a plurality of receivers arranged in a predetermined spaced-apart relationship, the method comprising the steps of: each receiver receiving a signal sent by the transmitter, processing the signal received at each receiver to produce a processed signal, receiving a processed signal at a control unit and stopping a timer associated with each one of the plurality of receivers, each respective timer being stopped generally at the time of reception of the received signal by each receiver, sending a timeout signal to a feedback processing means if a timer is not stopped within a predetermined amount of time and adjusting the signal processing in response to a timeout signal.

Other aspects and features of the present invention will become apparent to those ordinarily skilled in the art upon review of the following description of specific embodiments of the invention in conjunction with the accompanying figures.

DETAILED DESCRIPTION OF THE EMBODIMENTS OF THE INVENTION

Figure 1:
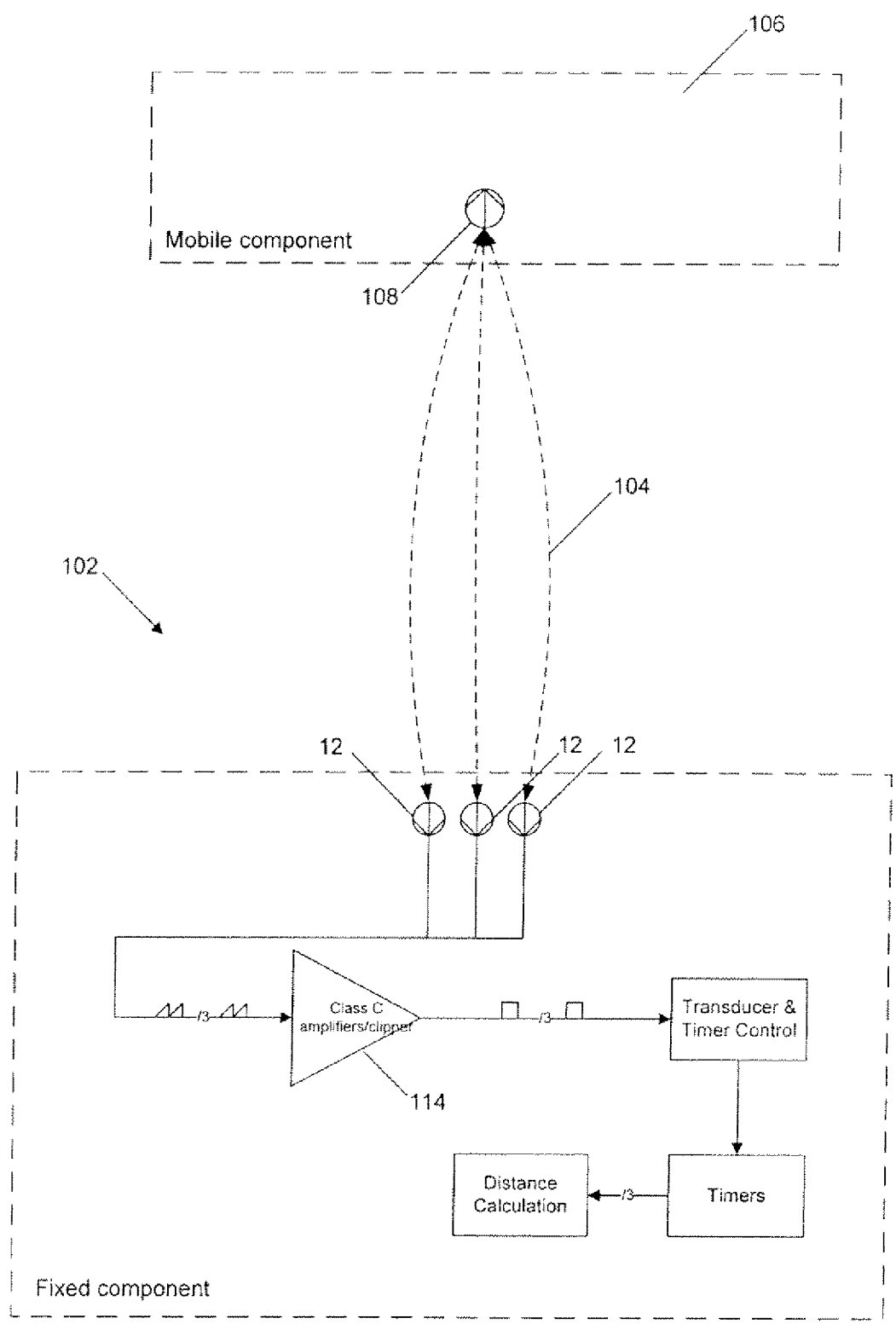
FIG. 1 illustrates a prior art position sensing system.

The system for position sensing will now be described in more detail, with reference to the position sensing system 2 illustrated in FIG. 2. In this system the mobile component 6 is wireless and has a battery power supply (not shown), a transmitter 8 and a transmitter controller 9 coupled to the transmitter 8. The transmitter controller 9 serves to control the transmission and idle modes of the transmitter 8 and also any amplification and buffering of the signal 4 which occurs.

Figure 2:
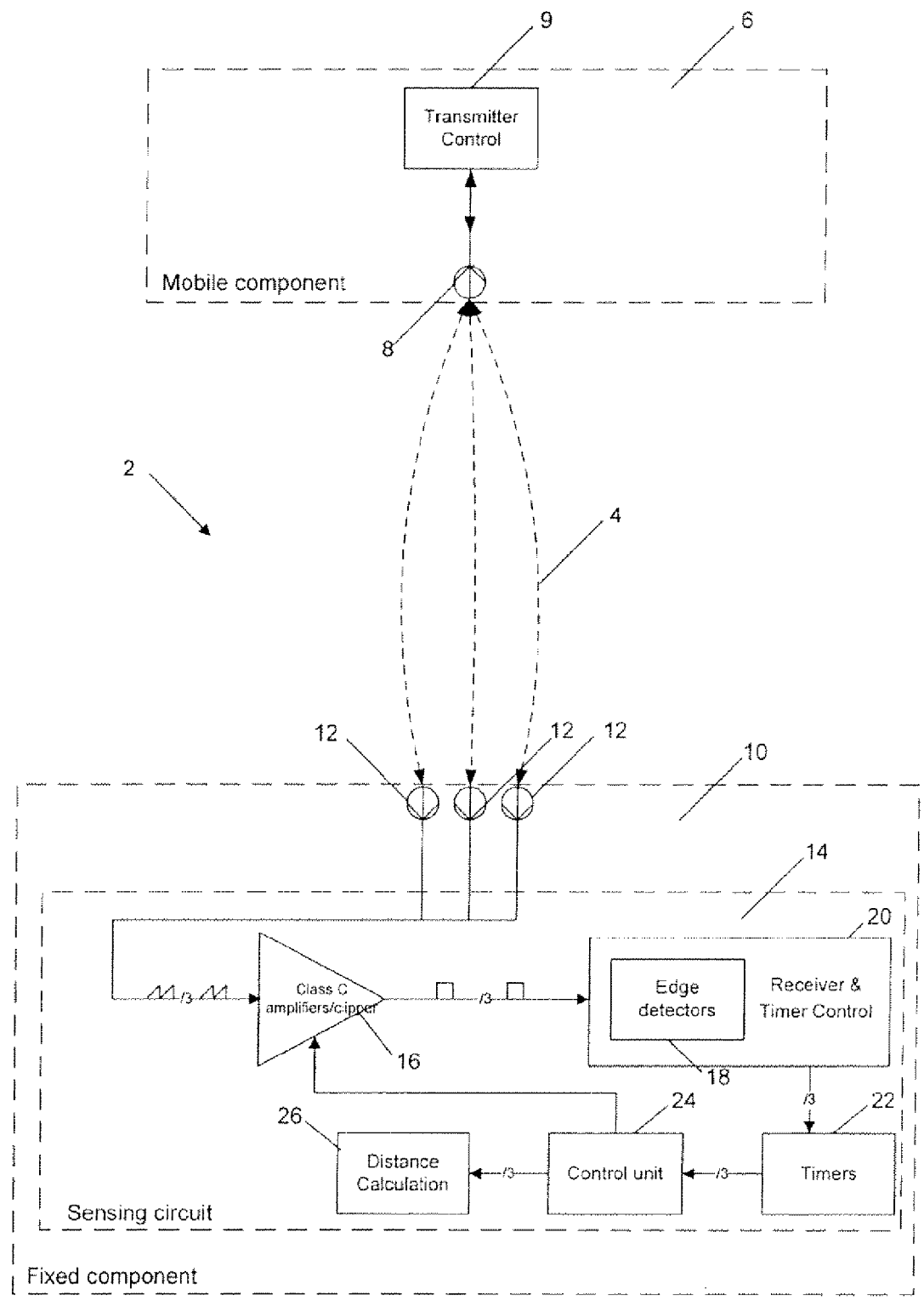
FIG. 2 illustrates a position sensing system of the present invention.

With reference also to FIG. 2, the fixed component 10 has a plurality of receivers 12 suitable for receiving a signal 4 sent by the transmitter 8 in the mobile component 6. The fixed component 10 also includes a sensing circuit 14 responsible for deter wining the position of the mobile component 6 as described below.

Figure 3:
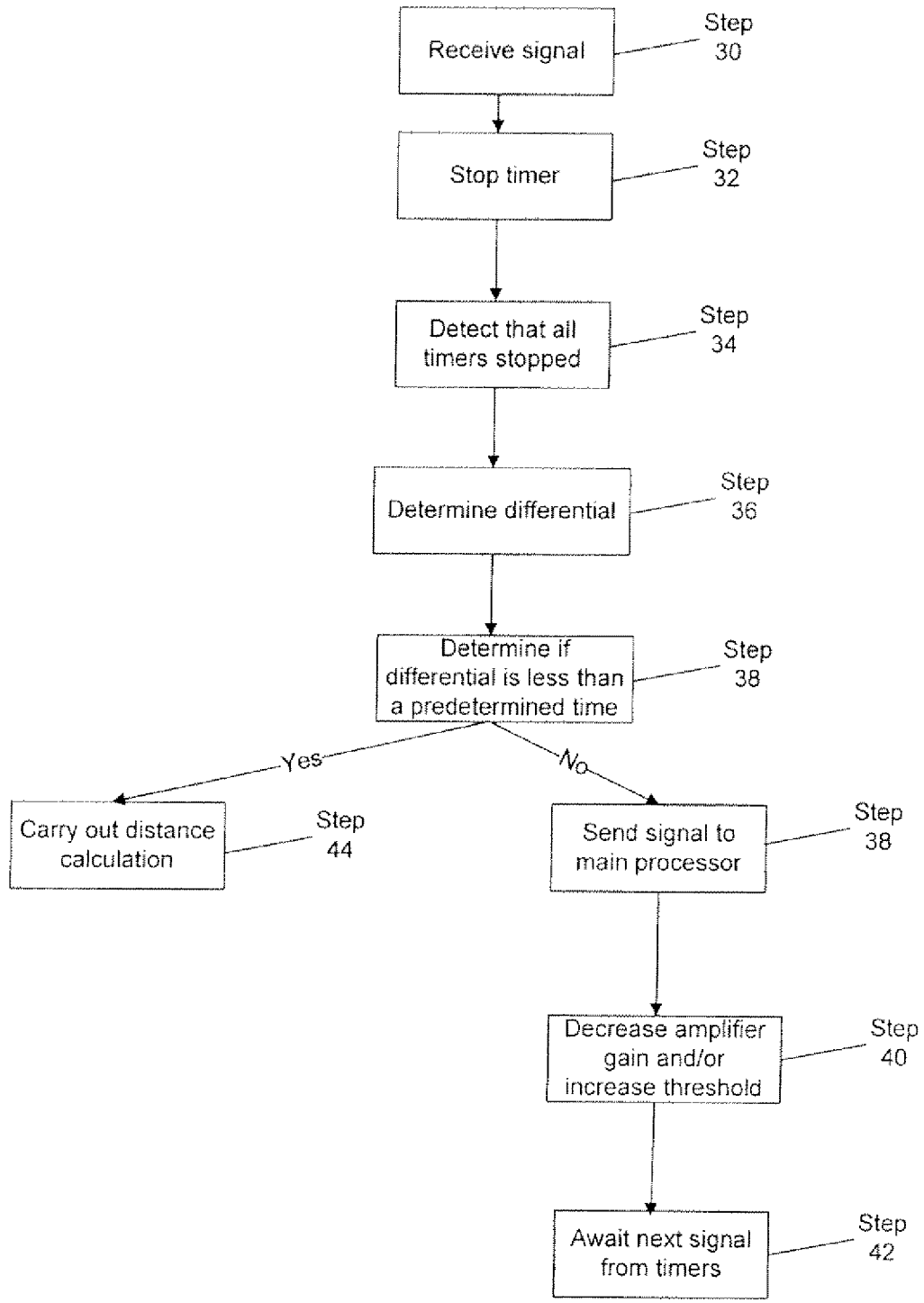
FIG. 3 is a flow diagram illustrating a method of the present invention.

In use, as illustrated in the flow diagram of FIG. 3, the mobile component transmitter 8 sends a signal 4. The triggering an control of the signal 4 may be carried out as described in PCT/GB07/003126 the disclosure of which is incorporated herein by reference. The signal 4 is received by each receiver 12 of the fixed component 10 at different times due to their different proximity to the mobile component 6 (step 30). As each receiver 12 receives the signal 4 it passes the received signal 4 to the sensing circuit 14. The signal 4 is passed to a high gain amplifier 16 in Class C operation which serves to clip the incoming signal 4 to produce a generally square waveform. The waveform is then passed to an edge detector 18 in the receiver and timer control unit 20. When the edge detector 18 detects an edge of the square waveform the receiver and timer control unit 20 stops a timer 22 associated with the receiver 12 which received the signal 4 (Step 32).

Once all the receivers 12 have received a signal 4 and the timers 22 have been stopped (Step 34), the times on each of the timers 22 are passed to a control unit 24 which determines the differential, the difference between the longest time recorded by one of the timers 22 and the shortest time recorded by one of the timers 22 (Step 36). The control unit 24 then determines whether the differential is greater or less than a predetermined value (Step 38).

Figure 5A:
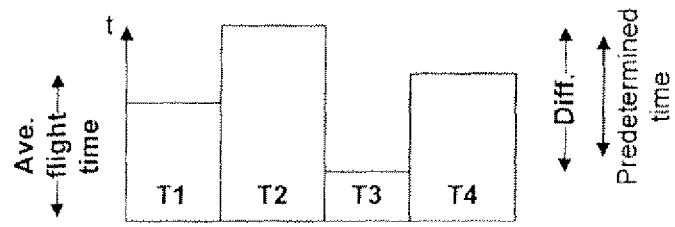
FIGS. 5a to 5c illustrate possible times recorded by the timers of the position sensing system of the present invention.

If the differential is greater than a predetermined value, as illustrated with reference to times recorded by timers T1 to T4 in FIG. 5a, then a signal is sent to a processor (not shown) within the control unit 24 (Step 38). Upon receiving this signal the processor causes the gain of the amplifier 16 to be decreased (Step 40) thereby reducing the likelihood of error signals stopping a timer 22. The gain of the amplifier is decreased because a large differential is suggestive of errors caused by reflections.

Figure 5B:
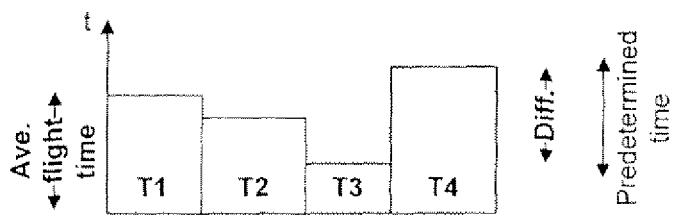

If the differential is less than a predetermined difference value, as illustrated with reference to times recorded by timers T1 to T4 in FIG. 5b, then the tunes are passed to a distance calculator 26 which calculates the relative position of the components using the values stored in the timers 22 against each receiver 12 (Step 44). The 3-dimensional position of the mobile component 6 is then determinable using trigonometric calculations.

Figure 5C:
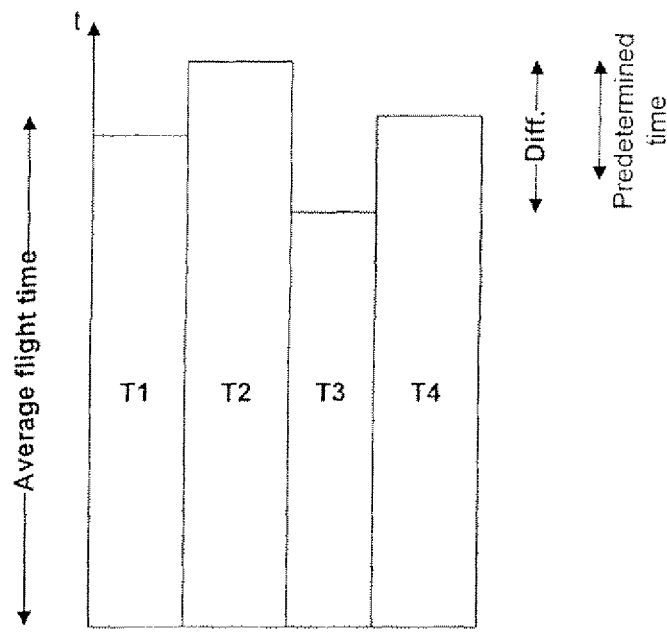

The gain of the amplifier may be reduced in any suitable way. For example, the gain may be decreased by a specified amount for every time that the differential is greater than the predetermined value. Alternatively, the reduction in the gain may be based upon the average of all of the time of flight readings by the timers. Where (as illustrated in FIG. 5a) the average time of flight determined by each of timers T1 to T4 is small, there is a short distance between the mobile and fixed components. In this instance the reduction in gain will be large to increase the sensitivity of the fixed component and enable it to more accurately measure short distances. Conversely, as illustrated in FIG. 5c, where the average time of flight determined by each of timers T1 to T4 is large, there is a greater distance between the mobile and fixed components and the reduction in the amplifier's gain is smaller, or may even be negative to reduce the sensitivity of the fixed component and enable it to disregard reflected signals.

The gain of the amplifier may be adjusted according to the results of several consecutive signals until the differential is no longer greater than the predetermined value.

Figure 4:
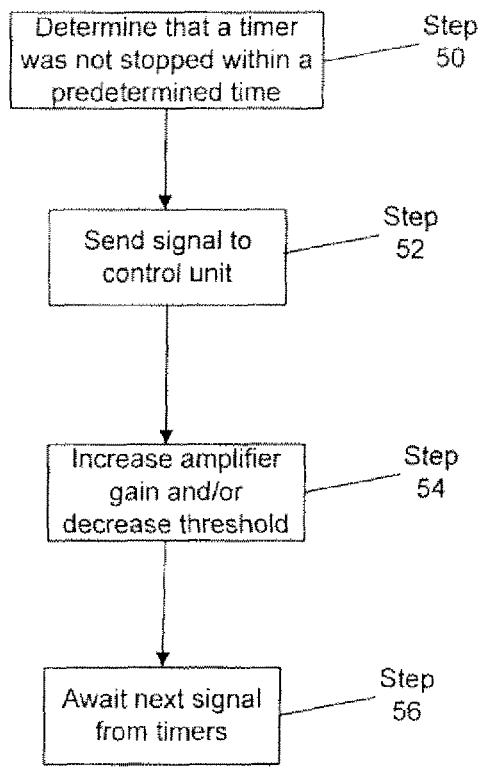
FIG. 4 is a flow diagram illustrating a method of the present invention.

The fixed component may also be arranged to determine that no signal was received by the receivers within a predetermined time period, herein referred to as a timeout (Step 50 FIG. 4) and send a signal to the control unit (Step 52). If a timeout occurs for the timers in the fixed unit then the control unit increases the amplifier's gain by a set amount (Step 54). This can be repeated if timeouts occur within further predetermined periods of time until signals cause the timers to stop within the predetermined period of time.

A timeout may occur if none of the times are stopped within a predetermined time. Alternatively, a timeout may occur when one or two timers are not stopped within the predetermined time.

In this way the sensing system can be adjusted dynamically to take into account the surroundings in which it is being used.

Optionally, the received signal may be processed using threshold adjustable comparators (not shown) or any other suitable device in the place of the amplifiers. In the case where threshold adjustable comparators are used the threshold is increased if the differentials are greater than a predetermined value and reduced if a timeout occurs.

Typically four receivers will be used which provides 4 possible triangulation solutions which may then be averaged or otherwise processed, for improved accuracy. Only three receivers may he used (providing a single triangulation solution) if lesser accuracy is required and this option is encompassed in the present application. More than four receivers may also be used, providing further increased accuracy but at greater manufacturing cost.

It is desirable that the signal sent between the transmitter and receiver is an ultrasonic frequency signal having a frequency above approximately 20 kHz. However, any suitable frequency may be used.

What is claimed is:

1. A fixed component capable of performing position sensing of a wireless mobile component including a transmitter, the fixed component comprising:
   a) a plurality of receivers arranged in a predetermined spaced-apart relationship, each receiver configured to receive a signal;
   b) a plurality of timers, each timer being associated with a respective one of the plurality of receivers;
   c) a signal processor configured to process signals received at each receiver;
   d) a timer control configured to stop a given timer of the plurality of timers at a stop time for the given timer in response to a processed signal provided by the signal processor; and
   e) a feedback processor configured to determine the maximum difference between stop times among the plurality of timers, determine if the maximum difference is larger than a specified value and cause an adjustment to the signal processor if the difference is larger than the specified value.

2. A fixed component according to claim 1, wherein the timer control is further arranged to send a timeout signal to the feedback processor when no signal is received within a time period and the feedback processor is configured to adjust the signal processor in response to a timeout signal.

3. A fixed component according to claim 1, wherein the signal processor includes an amplifier and adjusting the signal processor comprises varying the gain of the amplifier.

4. A fixed component according to claim 3, wherein the feedback processor is configured to decrease the gain of the amplifier in response to determining that the maximum difference is larger than a specified value.

5. A fixed component according to claim 2, wherein the signal processor includes an amplifier, adjusting the signal processor comprises varying the gain of the amplifier, and the feedback processor is configured to increase the gain of the amplifier in response to a timeout signal.

6. A fixed component according to claim 5, wherein the feedback processor is configured to decrease the gain of the amplifier in response to determining that the maximum difference is larger than a specified value.

7. A fixed component according to claim 1, wherein the signal processor comprises a comparator and adjusting the signal processor comprises varying the threshold of the comparator.

8. A fixed component according to claim 7, wherein the feedback processor is configured to increase the threshold of the comparator in response to determining that the maximum difference is larger than a specified value.

9. A fixed component according to claim 2, wherein the signal processor comprises a comparator, adjusting the signal processor comprises varying the threshold of the comparator, and the feedback processor is configured to decrease the threshold of the comparator in response to a timeout signal.

10. A fixed component according to claim 9, wherein the feedback processor is configured to increase the threshold of the comparator in response to determining that the maximum difference is larger than a specified value.

11. A fixed component according to claim 1, wherein the feedback processor is further configured to calculate the average of the times recorded by the timers and adjust the signal processor by a large amount when the average of the times is above a predetermined value and by a small amount when the average of the times is below a predetermined value.

12. A fixed component according to claim 1, wherein the signal processor is varied in incremental steps.

13. A method of sensing the position of a wireless mobile component including a transmitter by a fixed component including a plurality of receivers arranged in a predetermined spaced-apart relationship, the method comprising the steps of:
   a) each receiver receiving a signal;
   b) processing the signal received at each receiver to produce a processed signal;
   c) receiving a processed signal at a control unit and stopping a timer associated with each one of the plurality of receivers, each respective timer being stopped in response to a processed signal provided by the signal processor;
   d) determining the maximum difference between each of the times at which each timer was stopped;
   e) determining if the maximum difference is larger than a specified value; and
   f) adjusting the processing of the signal if the difference is larger than the specified value.

14. A method of position sensing according to claim 13, further comprising the step of sending a timeout signal if no signal is received by the receivers within a time period and adjusting the processing of the signal in response to a timeout signal.

15. A method of position sensing according to claim 13, further comprising the step of calculating the average of the times recorded by the timers and adjusting the processing of the signal by a large amount when the average of the times is above a predetermined value and by a small amount when the average of the times is below a predetermined value.

16. A method of position sensing according to claim 13, wherein the processing of the signal is varied in incremental steps.

17. A computer program embedded on a non-transitory computer-readable medium, the computer program configured to be carried out on a fixed component to cause the fixed component to carry out the steps of:
   a) each receiver receiving a signal;
   b) processing the signal received at each receiver to produce a processed signal;
   c) receiving a processed signal at a control unit and stopping a timer associated with each one of the plurality of receivers, each respective timer being stopped in response to a processed signal provided by the signal processor;
   d) determining the maximum difference between each of the times at which each timer was stopped;
   e) determine if the maximum difference is larger than a specified value; and
   f) adjusting the processing of the signal if the difference is larger than the specified value.

18. The computer program of claim 17, the steps further comprising sending a timeout signal no signal is received by the receivers within a time period and adjusting the processing of the signal in response to a timeout signal.

19. The computer program of claim 17, the steps further comprising calculating the average of the times recorded by the timers and adjusting the processing of the signal by a large amount when the average of the times is above a predetermined value and by a small amount when the average of the times is below a predetermined value.

20. The computer program of claim 17, wherein the processing of the signal is varied in incremental steps.

21. A fixed component capable of performing position sensing of a wireless mobile component including a transmitter, the fixed component comprising:
   a) a plurality of receivers arranged in a predetermined spaced-apart relationship, each receiver configured to receive a signal;
   b) a plurality of timers, each timer being associated with a respective one of the plurality of receivers;
   c) a signal processor configured to process signals received at each receiver;
   d) a control unit configured to stop a given timer of the plurality of timers at a stop time for the given timer in response to a processed signal provided by the signal processor and to send a timeout signal to a feedback processor when no signal is received within a time period; and
   e) the feedback processor configured to cause an adjustment to the signal processor in response to the timeout signal.

22. A fixed component according to claim 21, wherein the feedback processor is further configured to determine the maximum difference between each of the times at which each timer was stopped, determine if the maximum difference is larger than a specified value and cause an adjustment to the signal processor if the difference is larger than the specified value.

23. A method of sensing the position of a wireless mobile component including a transmitter by a fixed component including a plurality of receivers arranged in a predetermined spaced-apart relationship, the method comprising the steps of:
   a) each receiver receiving a signal;
   b) processing the signal received at each receiver to produce a processed signal;
   c) receiving a processed signal at a control unit and stopping a timer associated with each one of the plurality of receivers, each respective timer being stopped in response to a processed signal provided by the signal processor;
   d) sending a timeout signal to a feedback processor if a timer is not stopped within a predetermined amount of time; and
   e) adjusting the signal processing in response to the timeout signal.

24. A computer program embedded on a non-transitory computer-readable medium, the computer program configured to be carried out on a fixed component including a plurality of receivers to cause the fixed component to carry out the steps of:
   a) each receiver receiving a signal;
   b) processing the signal received at each receiver to produce a processed signal;
   c) receiving a processed signal at a control unit and stopping a timer associated with each one of the plurality of receivers, each respective timer being stopped in response to a processed signal provided b the signal processor;
   d) sending a timeout signal to a feedback processor if a timer is not stopped within a predetermined amount of time; and
   e) adjusting the signal processing in response to the timeout signal.

* * * * *